(No Model.)

E. B. LAKE.
VEHICLE SPRING.

No. 356,649. Patented Jan. 25, 1887.

WITNESSES
Will. de Powell.
A. H. Connolly.

INVENTOR
Ezra B. Lake
By Connolly Bros.
Attorneys.

UNITED STATES PATENT OFFICE.

EZRA B. LAKE, OF CAMDEN, NEW JERSEY.

VEHICLE-SPRING.

SPECIFICATION forming part of Letters Patent No. 356,649, dated January 25, 1887.

Application filed June 29, 1886. Serial No. 206,621. (No model.)

*To all whom it may concern:*

Be it known that I, EZRA B. LAKE, a citizen of the United States, residing at Camden, in the county of Camden and State of New Jersey, have invented certain new and useful Improvements in Vehicle-Springs; and I do hereby declare the following to be a full, clear, and exact description of the invention, reference being had to the accompanying drawings, which form part of this specification, in which—

Figure 1:
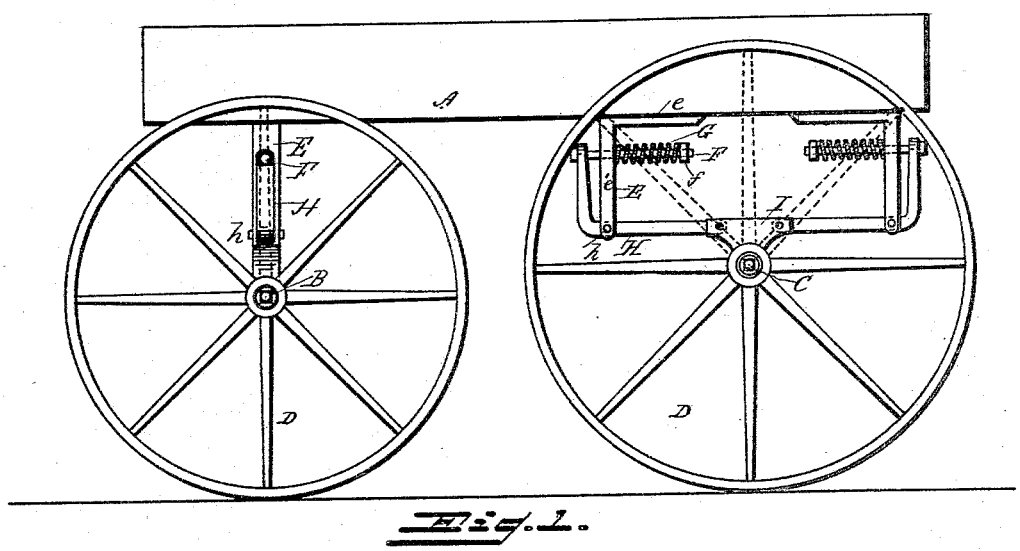
Figure 2:
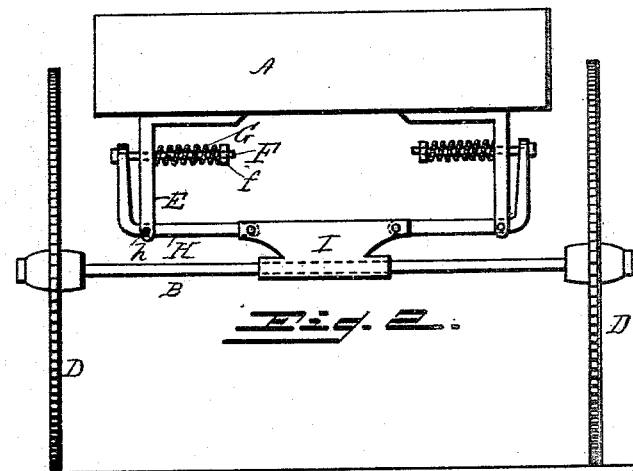
Figure 3:
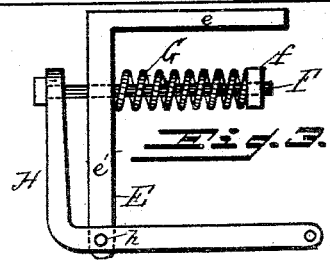

Figure 1 is a side elevation, and Fig. 2 an end elevation, of a wagon with my improvements applied thereto. Fig. 3 is a detail view, side elevation of spring-support.

My invention relates to elastic supports for the bodies of wagons, carriages, and other vehicles, and my improvements have for their object to provide a construction comprising a bracket, a lever, and a spring, whereby the compression and expansion of the spring will be exerted horizontally and the body have less vertical movement than it would have if supported in the usual manner.

My invention consists in the peculiar construction and combinations of parts, hereinafter fully described, and specifically claimed.

Referring to the accompanying drawings, A represents the body of a wagon, carriage, or other vehicle to which my invention is applied. B is the front axle, C the rear axle, and D D the wheels, belonging to said vehicle.

E represents a bracket in the form of a rigid L-shaped piece, one arm of which, $e$, is bolted or firmly secured to the under side of the body A, the other arm, $e'$, being vertical and pendent and slotted for the passage of a bolt, F. Said bolt is encircled by a spiral spring, G, which fits between the arm $e'$ and a nut, $f$, on said bolt.

H is an L-shaped lever, fulcrumed at $h$ on the bracket E, and connected at one end to the bolt F and at the other end pivotally secured to the axle, or to a block, I, thereon. The spring or elastic support between the body and axle accordingly comprises four parts — viz., a bracket secured to the body, a horizontally-disposed spring, a bolt for compressing said spring, and a lever connecting said bolt with the axle so that the movements of the latter will have an effect on the spring, the spring being compressed when the axle ascends and expanding when the axle descends.

It will be observed that the spring is supported on the body and that the fulcrum of the lever is so located that the arm of the latter between said fulcrum and the axle-connection is longer than the other arm; hence the vertical movement of the body when the spring is compressing and expanding is less in extent than the simultaneous vertical movement of the axle, and by increasing the disparity between the lengths of the two arms of the lever the proportionate extent of movement of the body, as compared with the movement of the axle, may be lessened.

By turning the nut $f$ the tension of the spring may be adjusted to any desired extent.

To support the body several springs, brackets, and levers (or at least two of each) should be employed. The levers and springs may be either parallel with and in the same vertical plane as the axle, as shown attached to the front axle in Figs. 1 and 2 of the drawings, or they may be in a plane transverse to the axle, as shown applied to the rear axle in Fig. 1.

The spring may be a spiral, india-rubber, or other form of spring suitable for the purpose in view.

The bracket is not necessarily L-shaped, and may be of any convenient form.

If the axle be a wooden or partly wooden one, the lever may be directly pivoted thereon; but if said axle be wholly metallic a block, I, should be employed, said block being rigidly secured to said axle by bolts and clips, or equivalent fastenings.

What I claim as my invention is—

1. An elastic support for the bodies of wagons, carriages, or vehicles, comprising a bracket, E, adapted and designed to be secured to the body of a vehicle, a horizontally-arranged spring supported on said bracket, a bolt passing through said spring, and a lever fulcrumed on said bracket and pivotally connected to said bolt, substantially as shown and described.

2. The combination, with a body, A, and axle B, of bracket E, fastened to said body, spring G, supported on said bracket, bolt F, and lever H, said lever having one of its ends secured to said bolt, its other end having a pivotal connection with the axle, substantially as shown and described.

3. The combination, with bracket E, spring G, and lever H, of bolt F, having nut $f$, whereby the tension of the spring may be adjusted, substantially as shown and described.

In testimony that I claim the foregoing I have hereunto set my hand this 3d day of June, 1886.

EZRA B. LAKE.

Witnesses:
M. D. CONNOLLY,
R. DALE SPARHAWK.